United States Patent [19]
Johnson

[11] 3,806,791
[45] Apr. 23, 1974

[54] MICRO-MINIATURE HIGH EFFICIENCY POWER SUPPLY

[75] Inventor: Leo J. Johnson, Escondido, Calif.

[73] Assignee: The United States of America as represented by the Secretary of the Navy, Washington, D.C.

[22] Filed: Dec. 4, 1972

[21] Appl. No.: 312,068

[52] U.S. Cl. .............. 321/2, 321/45 S, 323/DIG. 1
[51] Int. Cl. ............................................ H02m 3/32
[58] Field of Search ........... 321/2, 18, 45 S; 323/17, 323/227, 23, 25, DIG. 1

[56] References Cited
UNITED STATES PATENTS
3,365,650  1/1968  Camp et al. ................... 323/DIG. 1
3,551,777  12/1970  Bingley ................................. 321/2

Primary Examiner—A. D. Pellinen
Attorney, Agent, or Firm—R. S. Sciascia; G. J. Rubens; T. M. Phillips

[57] ABSTRACT

A micro-miniaturized high efficiency power supply utilizing the principle of open loop voltage regulation. The circuit employs full-wave rectification at the input followed by filtering, pre-regulation, inverter isolation and final saturated series regulation with noise suppression and energy storage filters at appropriate strategic places. A hold up circuit initially supplies power to control circuitry. When a pre-regulator attains a predetermined value the hold up circuit is turned off and a pre-regulator then supplies power to the control circuitry.

6 Claims, 4 Drawing Figures

MICRO-MINIATURE HIGH EFFICIENCY POWER SUPPLY

BACKGROUND OF THE INVENTION

One of the common problems encountered (when developing electronic systems for communications, digital processing, transmitters or receivers, or other electronic functions) is the problem of the designer employing a laboratory "bench" power supply during early stages of development and then trying to reproduce the same system characteristics in the final package with a modular power supply having the same characteristics as the bench power supply. Usually the electronic design engineer is a specialist in the field of application (such as digital design, etc.), and is not a specialist in power supply design. Therefore, the electronics design engineer quite often specifies his power supply requirements in his own terms and not in the terms of optimum power supply design. Further, the power used by the electronics of direct interest to the electronics design engineer is usually considered by him as incidental. Then, it is up to the supplier of the power supply to determine a more specific performance requirement which will assure satisfactory power conversion for the electronics application at hand. One way to do this with quality assurance is to duplicate the laboratory bench power supply first used. Physical space, cost and application environments usually prohibit the operation of laboratory bench power supplies in the production models of electronic systems. Attempts have been made to standardize micro-electronic power supplies. Some systems, for example used pre-regulation through pulse width control, the process well known for its radio frequency interference generation problems.

Power supplies of the present state of the art use a wide variety of techniques for voltage regulation, current limiting, power conversion, and filtering. Miniaturization and even micro-miniaturization has been accomplished and many good designs exist representing present day state of the art. However, combined properties of relatively large power, high ratios of input to output voltage, good regulation, and filtering cannot readily be obtained in one microminiature package with present state of the art design application procedures. The major difficulties in obtaining reduction in size are caused by the low frequency (60KHz) input requirements for the prime power source. The present technology either smooths the ripple with energy storage elements such as capacitors and chokes or clips the voltage peaks with dissipative circuits. These methods of smoothing are undesirable for miniaturization because energy storage devices grow in porportion to the amount of storage required and dissipative circuits increase the heat sink requirements.

SUMMARY OF THE INVENTION

The present invention provides a highly efficient micro-miniaturized high power supply capable of micro-miniaturization by reducing the size requirements on all power components normally used for voltage conversion, voltage stabilization and filtering. The magnetic components are reduced in size by using high frequency techniques. The capacitors are reduced in size by reducing the energy storage requirements for a period and by the use of distributed, decoupling circuits.

In utilizing the principle of open-voltage regulation, pulse width control is used. This is accomplished by means of a pulse width generator which produces a constant volt-time integral such as a saturable core reactor, the width of the pulse is narrowed as the voltage increases and is widened as the voltage decreases. The pulse repetition rate is held constant such that the only relationship required is $V = K/T$ where $V$ is the input voltage, $K$ is the desired constant and T is the time within the repetition rate interval. A hold-up circuit is provided to provide a smooth and uninterrupted flow when the input voltage drops below some predetermined minimum value. A constant frequency timing circuit provides a constant frequency timing by means of a saturable core transformer that provides a constant frequency timing with the secondary clamped by the emitter base diode in the inverter. As shown in FIGS. 2 and 3 the total input voltage profile provides a wide range of acceptable power source parameters. A designer may then design his electronic equipment on the bench with the same power supply that is shipped in the final prototype even though the source power in the final application is greatly different from the source power in his laboratory.

DESCRIPTION OF THE PREFERRED EMBODIMENTS

Figure 1:
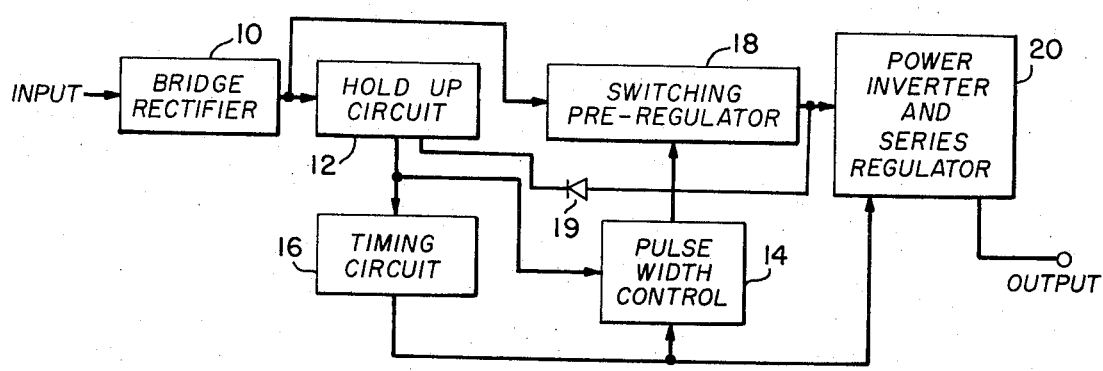
FIG. 1 is a block diagram of a preferred embodiment of the invention.
Figure 2:
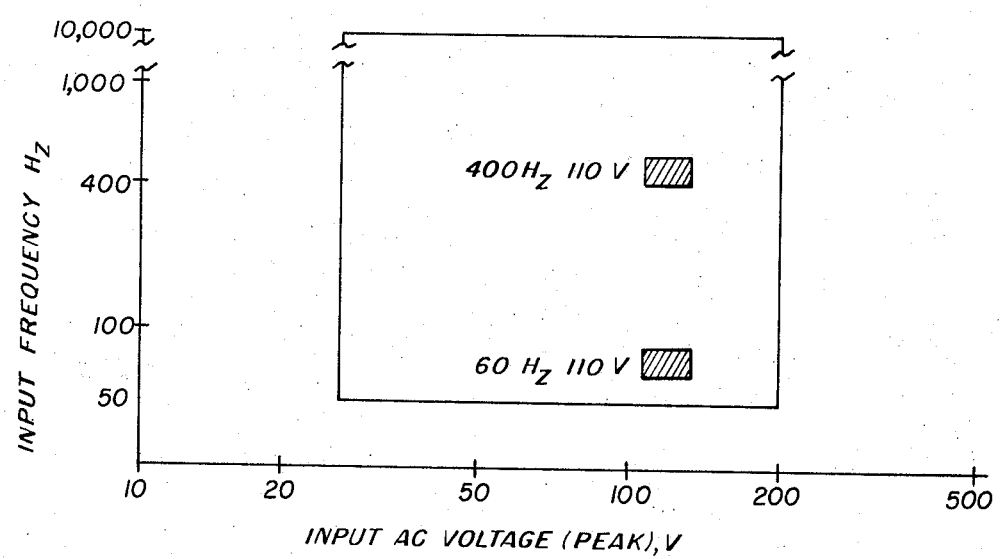
FIGS. 2 and 3 are graphs showing the increase in frequency-voltage and dc voltage ranges obtained by means of the embodiment of FIG. 1.
Figure 3:
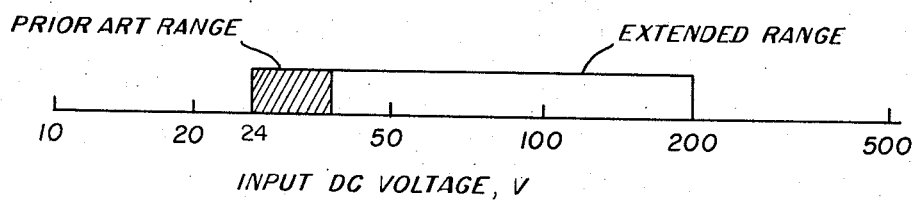

Referring now to FIG. 1 there is shown in block diagram form a bridge rectifier 10 for receiving either an ac or dc voltage input which may vary form 20 volts to 200 volts. The output from rectifier bridge 10 is fed into hold-up circuit 12 which in addition to filtering or smoothing insures that the voltage will not drop below the input voltage. During start up of the power supply, hold up circuit 12 supplies power to timing circuit 16 and pulse width control 14. Timing circuit 16 converts the dc voltage to a high frequency square wave output which is fed to pulse width control 14 which in turn controls switching pre-regulator 18. The output of bridge rectifier 10 is also fed to switching pre-regulator 18. According to an important feature of the invention, the output of switching pre-regulator 18 is fed back to hold up circuit 12 by means of a diode 19. The purpose of this feedback arrangement is to remove hold up circuit 12 from operation as long as the output of pre-regulator 18 is above a pre-determined value and to supply power to timing circuit 16 and pulse width control 14. The pre-regulated voltage from regulator 18 is then inverted and regulated in power regulator 20.

Figure 4:
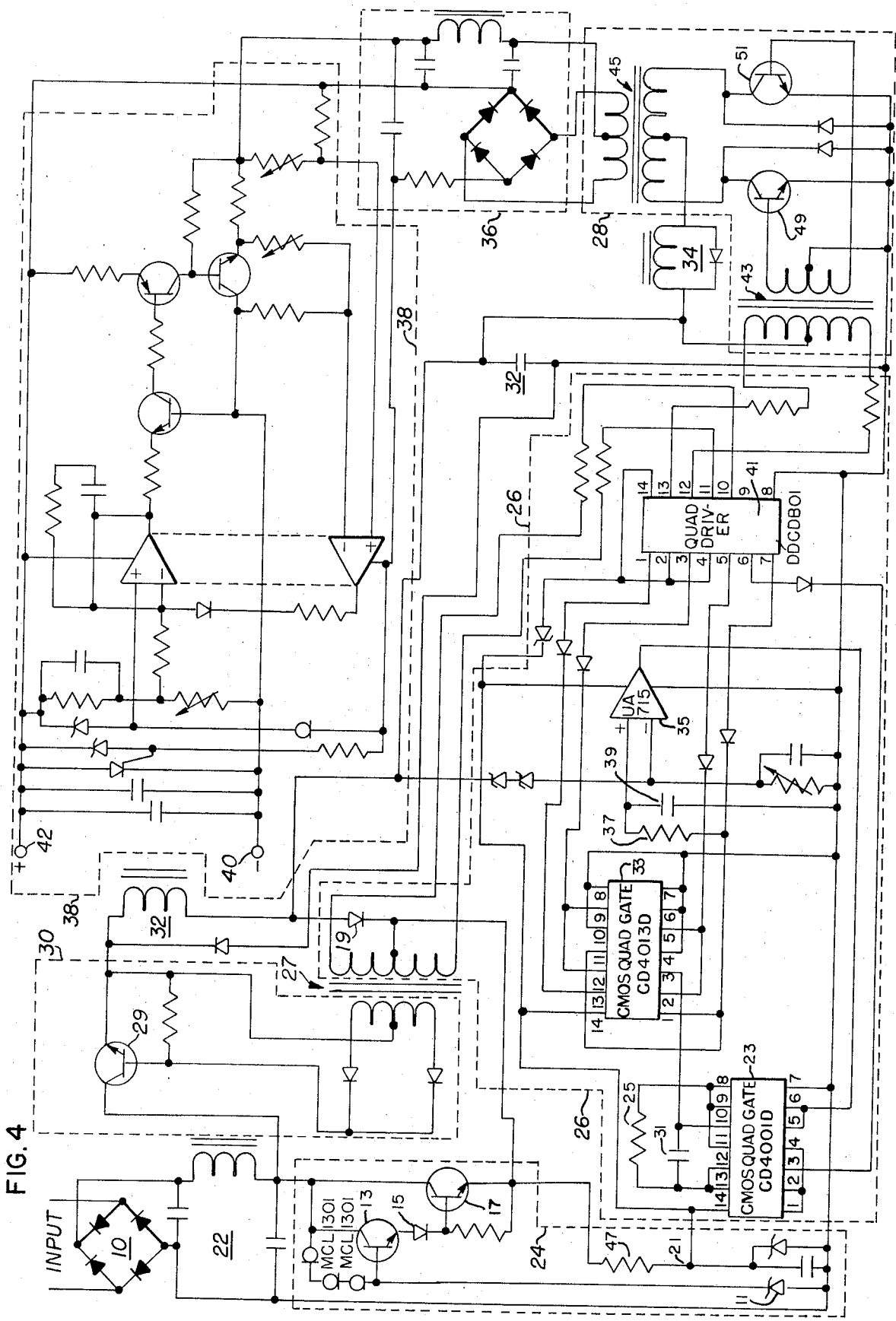
FIG. 4 is a schematic diagram of the embodiment of FIG. 1.

In operation and referring to FIG. 4, an ac or dc voltage is applied to the input of bridge rectifier 10 to convert the ac or dc voltage to a dc voltage of fixed polarity. The rectified voltage is filtered by means of filter 22 for ripple reduction and energy storage. The filtered voltage is fed to pull-up or hold-up circuit 24 which utilizes zener voltage regulation to provide a minimum output voltage to driver circuit 26 until switching regulator 30 becomes functional. Hold up circuit 24 comprises an emitter follower regulator made up of the three series connected MCL1301 current regulators in circuit with a zener diode 11 with their common junction connected to the base of transistor 13. The emitter of transistor 13 is coupled through diode 15 to the base of transistor 17. The regulated output voltage from hold up circuit 24 is fed from terminal 21 to provide power to driver circuits 26. Driver circuit 26 provides the two functions of regulating the switching of pre-regulator 30 by controlling the base voltage of transistor 29 and supplying power to inverter circuit 28. Constant frequency control is obtained by means of an internal frequency generator by using CMOS gates in quad gate 23 by connecting resistor 25 across terminals 8, 9, and 11 and 12 and 13 and capacitor 31 across terminals 10 and 12 and 13. Pulse width control is accomplished by quad gate 23 and amplifier 35. The ramp reference voltage is generated by the resistor 37, capacitor 39 network connected to the positive input terminal of amplifier 35 and the sense voltage produced at the negative input of amplifier 35. The pulse width controlled output voltage is coupled from pins 10 and 11 of quad driver 41 to the primary winding of transformer 27 of pre-regulator 30. The voltage appearing at the base of transistor 29 is then proportional to the voltage out of quad driver 41. The output voltage from pins 12 and 13 is fed to the primary winding of transformer 43 of inverter circuit 28. The output of pre-regulator 30 is fed to the primary winding center tap of transformer 45 through choke limiter and energy feedback circuit 34. Transistor switches 49 and 51 are alternately turned on and off at the frequency of the output voltage of transformer 43. The output from pre-regulator 30 is also fed through diode 19 to hold up circuit 24.

At start up the output of pre-regulator 30 is zero voltage. The voltage source for the control circuits 23, 33 and 41 is supplied from terminal of hold up circuit 24. As the frequency generator 23 in combination with sense amplifier 35 and quad driver 41 provides excitation to transformer 27, current flows through transistor 29 of switching regulator 30 to integrating filter 32. The voltage at the anode of blocking diode 19 increases and continues to increase until diode 19 conducts (becomes forward biased). The current flowing through diode 19 raises its cathode voltage which is the same voltage on the emitter of transistor 17. Since the base of transistor 13 is clamped by zener diode 11, the two transistor circuit is emitter to base back biased which turns off the two transistors. Power is then supplied to terminal 21 and control circuits 23, 33, and 41 from pre-regulator 30 through diode 19 and resistor 47. The output from pre-regulator 30 is fed through integrating filter 32 and choke limiter and energy feedback circuit 34 to inverter circuit 28. Choke limiter and energy feedback circuit 34 limits the rate of change of current from integrating filter 32 to inverter circuit 28 and still allows energy to return to integrating filter 32 from inverter 28. The output from inverter 28 is rectified by means of full-wave rectifier and filter circuit 36 and fed to series regulator 38. Terminals 40 and 42 are provided for connecting a load. The MOS devices and current limiters may be of the type shown in the drawing. Other components and values may be chosen to provide the desired regulation with selected inputs and desired power output.

Obviously many modifications and variations of the present invention are possible in the light of the above teachings. It is therefore to be understood that within the scope of the appended claims the invention may be practiced otherwise than as specifically described.

What is claimed is:

1. In a highly efficient power supply capable of micro-miniaturization, the combination comprising:
   a. rectifier circuit means having input terminals for receiving ac and dc input voltages and producing a dc output voltage of constant polarity,
   b. a self-regulating circuit means coupled to said rectifier circuit means for providing a constant output voltage when the voltage applied at said input terminal drops below a predetermined minimum value.
   c. timing circuit means coupled to the output of said self-regulating circuit means for converting said dc voltage to a high frequency square wave voltage,
   d. pulse width control circuit means having a first input coupled to the output of said self-regulating circuit means, a second input coupled to the output of said timing circuit means and having an output,
   e. switching pre-regulator circuit means having a first input coupled to the output of said rectifier circuit means, a second input coupled to the output of said pulse width control circuit means and having an output,
   f. a diode in circuit between the output of said switching pre-regulator circuit means and said self-regulating circuit means for turning off said self-regulating circuit means and supplying power to said timing circuit means and said pulse width control circuit means,
   g. power converter and series regulator circuit means coupled to the output of said switching pre-regulator circuit means and said timing circuit means for providing a regulated dc output voltage.

2. The power supply of claim 1 wherein said self-regulating circuit means includes a series regulating transistor which is in a conducting condition until turned off in response to a predetermined output voltage from said switching preregulator circuit means.

3. The power supply of claim 1 wherein the power converter includes a saturable transformer controlled by the output of said switching pre-regulator circuit means.

4. The power supply of claim 3 wherein a choke limiter and energy feedback circuit is coupled between said saturable transformer and the output of said switching pre-regulator circuit means.

5. The power supply of claim 1 wherein said self-regulating circuit means includes first and second transistors connected in tandum and being responsive to a predetermined value of back bias voltage coupled from said switching regulator for dis-engaging said self-regulating circuit means from supplying power to said timing and pulse width control circuits.

6. The power supply of claim 5 wherein said first and second transistors are responsive to a decrease in the back bias voltage to a predetermined value for switching the power supplied to said timing and pulse width control circuits back to said self-regulating circuit.

* * * * *